(12) United States Patent
Ghosh et al.

(10) Patent No.: US 9,704,613 B2
(45) Date of Patent: Jul. 11, 2017

(54) POLYMER COMPOSITES WITH ELECTROMAGNETIC INTERFERENCE MITIGATION PROPERTIES

(71) Applicant: 3M INNOVATIVE PROPERTIES COMPANY, St. Paul, MN (US)

(72) Inventors: Dipankar Ghosh, Oakdale, MN (US); Biplab K. Roy, Austin, TX (US); Nitin S. Satarkar, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 28 days.

(21) Appl. No.: 14/769,554

(22) PCT Filed: Feb. 18, 2014

(86) PCT No.: PCT/US2014/016828
§ 371 (c)(1),
(2) Date: Aug. 21, 2015

(87) PCT Pub. No.: WO2014/130431
PCT Pub. Date: Aug. 28, 2014

(65) Prior Publication Data
US 2016/0019996 A1    Jan. 21, 2016

Related U.S. Application Data

(60) Provisional application No. 61/767,482, filed on Feb. 21, 2013.

(51) Int. Cl.
*H01B 1/22*    (2006.01)
*C08K 3/00*    (2006.01)
(Continued)

(52) U.S. Cl.
CPC ............. *H01B 1/22* (2013.01); *C08K 3/0033* (2013.01); *C08K 3/04* (2013.01); *C08K 3/22* (2013.01);
(Continued)

(58) Field of Classification Search
CPC ... H01B 1/22; H01B 1/24; C08K 3/08; C08K 3/04; C08K 3/22; C08K 2003/2248; C08K 3/0033; C08L 27/16
See application file for complete search history.

(56) References Cited

U.S. PATENT DOCUMENTS 3,671,275 A    6/1972    Gates
4,538,151 A *  8/1985    Hatakeyama ............ C08K 3/08
                                                    252/62.55
(Continued)

FOREIGN PATENT DOCUMENTS

CN    1470581    1/2004
EP    1502930    2/2005
(Continued)

OTHER PUBLICATIONS

Barba, "Carbon black/silicone rubber blends as absorbing materials to reduce Electro Magnetic Interferences (EMI)," Polymer Bulletin, 2006, vol. 57, pp. 587-593.

(Continued)

*Primary Examiner* — Mark Kopec
*Assistant Examiner* — Jaison Thomas
(74) *Attorney, Agent, or Firm* — Qiang Han

(57) ABSTRACT

Polymer composites that are suitable for use as electromagnetic interference mitigaters include a lossy polymeric matrix, ceramic particles dispersed within the polymeric matrix, and conductive particles dispersed within the polymeric matrix. The lossy polymeric matrix may be a fluorocarbon-based polymer matrix, or an epoxy-based polymer
(Continued)

matrix. The ceramic particles may be metal oxide particles, especially copper oxide (CuO) particles. The conductive particles may be carbon black. Other electromagnetic interference mitigating polymer matrices include a lossy polymeric matrix and copper oxide (CuO) particles dispersed within the polymeric matrix.

11 Claims, 10 Drawing Sheets

(51) Int. Cl.
    *C08K 3/04* (2006.01)
    *C08K 3/22* (2006.01)
    *H01B 1/24* (2006.01)

(52) U.S. Cl.
    CPC ....... *H01B 1/24* (2013.01); *C08K 2003/2248* (2013.01)

(56) References Cited

U.S. PATENT DOCUMENTS

| | | | |
|---|---|---|---|
| 4,568,603 A | 2/1986 | Oldham | |
| 5,180,513 A * | 1/1993 | Durand | C09D 11/101 174/377 |
| 5,397,854 A | 3/1995 | Catt | |
| 5,691,498 A | 11/1997 | Fogle, Jr. | |
| 6,310,141 B1 | 10/2001 | Chen | |
| 2002/0147264 A1* | 10/2002 | Takeuchi | C08K 3/04 524/495 |
| 2008/0131639 A1* | 6/2008 | Yamamoto | B32B 7/12 428/41.7 |
| 2009/0101873 A1* | 4/2009 | Tan | H05K 9/0083 252/519.31 |
| 2010/0055416 A1 | 3/2010 | Yang | |
| 2010/0294559 A1 | 11/2010 | Izawa | |
| 2010/0315105 A1* | 12/2010 | Fornes | H05K 9/0083 324/693 |
| 2011/0200740 A1 | 8/2011 | Ma | |
| 2011/0228442 A1* | 9/2011 | Zhang | H01G 4/18 361/311 |

FOREIGN PATENT DOCUMENTS

| | | |
|---|---|---|
| JP | 2006-107770 | 4/2006 |
| WO | WO 2014-099389 | 6/2014 |

OTHER PUBLICATIONS

Bhadra, "Large magnetoelectric effect and low-loss high relative permittivity in 0-3 CuO/PVDF composite films exhibiting unusual ferromagnetism at room temperature," Journal of Physics D: Applied Physics, Nov. 9, 2012, vol. 45, No. 48, pp. 485002-1-485002-8. XP020233248.

Brosseau, "Microwave characterization of filled polymers," Journal of Applied Physics, Apr. 15, 2001, vol. 89, No. 8, pp. 4532-4540.

Choi, "Frequency Dispersion Characteristics of the Complex Permittivity of the Epoxy-Carbon Black Composites," Journal of Applied Polymer Science, 1998, vol. 67, pp. 363-369.

Chung, "Electrical permittivity and conductivity of carbon black-polyvinyl chloride composites," Journal of Applied Physics, Oct. 1982, vol. 53, No. 10, pp. 6867-6879.

Gregorio, "Effect of crystalline phase, orientation and temperature on the dielectric properties of poly (vinylidene fluoride) (PVDF)," Journal of Materials Science, 1999, vol. 34, pp. 4489-4500.

Kim, "Simulation Method for Complex Permittivities of Carbon Black/Epoxy Composites at Microwave Frequency Band," Journal of Applied Polymer Science, 2006, vol. 100, pp. 2189-2195.

Lee, "EMI Shielding Properties of Carbon Nanofiber Filled Poly Vinylidene Fluoride Coating Materials," Journal of Industrial & Engineering Chemistry, 2001, vol. 7, No. 5, pp. 305-309.

Mironi-Harpaz, "Thermo-Electric Behavior (PTC) of Carbon Black-Containing PVDF/UHMWPE and PVDF/XL-UHMWPE Blends," Polymer Engineering and Science, 2001, vol. 41, No. 2, pp. 205-221.

Nanda, "Dielectric Relaxation of Conductive Carbon Black Reinforced Chlorosulfonated Polyethylene Vulcanizates," Polymer Composites, 2010, pp. 152-162.

Ting, Effect of Manganese Dioxide Dispersion on the Absorbing Properties of Manganese Dioxide ($MnO_2$)-Epoxy Composites, Journal of Chinese Chemical Society, 2009, vol. 56, pp. 1225-1230.

Youngs, "Dielectric relaxation in metal-coated particles: the dramatic role of nano-scale coatings," Journal of Physics D: Applied Physics, Jan. 6, 2005, vol. 38, No. 2, pp. 188-201.

International Search Report for PCT International Application No. PCT/US2014/016828, mailed on Oct. 8, 2014, 6 pages.

* cited by examiner

US 9,704,613 B2

POLYMER COMPOSITES WITH ELECTROMAGNETIC INTERFERENCE MITIGATION PROPERTIES

FIELD OF THE DISCLOSURE

This disclosure relates to polymer composites, especially polymer composites that are suitable for use as electromagnetic interference mitigaters.

BACKGROUND

Electromagnetic interference (EMI) is a common issue encountered in electronic systems, such as electronic communications systems. Outside electromagnetic radiation is well known to induce undesirable currents in electronic components, thereby disrupting their normal operations. In order to protect against such effects, it is common to completely shield an electronic device or component via highly conductive enclosures, coatings, gaskets, adhesives sealants, wire sleeves, metal meshes or filters, and the like. These types of shields operate by reflecting the unwanted electromagnetic fields away from the sensitive component. Another form of protection is offered by electromagnetic absorbing materials. These are typically not highly conductive and operate by absorbing the unwanted electromagnetic energy and converting it to heat. Absorbers are widely used in radar and stealth applications. They are also commonly found inside of electronic devices where they are used to control electromagnetic emissions from the device. Electromagnetic absorbers can be classified as magnetic absorbers if they interact principally with the magnetic field component of an electromagnetic wave or as dielectric absorbers if the interact principally with the electric field component of the wave.

A variety of different materials and methods have been used to provide EMI shielding. Some of these shielding methods involve non-polymeric matrices. For example, U.S. Pat. No. 3,671,275 (Gates et al.) describes a lossy dielectric attenuator comprised of the combination of silicon carbide and an alumina matrix; U.S. Pat. No. 5,691,498 (Fogle Jr.) describes an electromagnetically lossy liquid- or gas-tight fusion seal constructed of a matrix of glass binder and ferromagnetic and/or ferroelectric filler; and US Patent Publication No. 2010/0294559 (Izawa et al.) describes an electromagnetic shielding film including a laminate of at least an insulating layer and conductive metal layer. Other shielding methods involve polymeric matrices. For example, US Patent Publication No. 2010/0315105 (Fornes) describes an EMI shielding composite comprising a reactive organic compound and conductive filler that during the cure of the organic compound self-assembles into a three dimensional network of metal; and US Patent Publication No. 2011/0200740 (Ma et al.) which describes a carbon nanotube/polymer composite having EMI shielding effectiveness.

SUMMARY

Described herein are polymer composites that are suitable for use as electromagnetic interference mitigaters. In some embodiments, the polymer composite comprises a lossy polymeric matrix, ceramic particles dispersed within the polymeric matrix, and conductive particles dispersed within the polymeric matrix. The lossy polymeric matrix may comprise a fluorocarbon-based polymer matrix, a chlorine-containing polymer matrix, an epoxy-based polymer matrix, a (meth)acrylate polymer matrix, a polyether polymer matrix, or a combination thereof. In some embodiments the lossy polymeric matrix comprises a fluorocarbon-based polymer matrix or an epoxy-based polymer matrix. The ceramic particles comprise metal oxide particles, metal nitride particles, metal carbide particles, metal sulfide particles, metal silicide particles, metal boride particles, particles of multiferroic compounds, mixed ceramic particles, chalcogenide glass particles, or a combination thereof. In some embodiments, the ceramic particles comprise metal oxide particles, especially copper oxide (CuO) particles. The conductive particles comprise carbon black, carbon bubbles, carbon foams, graphene, carbon fibers, graphite, carbon nanotubes, metal particles and nanoparticles, metal alloy particles, metal nanowires, PAN fibers, conductive-coated particles, or a combination thereof. In some embodiments, the conductive particles comprise carbon black.

Other embodiments of polymer composites that are electromagnetic interference mitigaters comprise a lossy polymeric matrix and copper oxide (CuO) particles dispersed within the polymeric matrix. The lossy polymeric matrix may comprise a fluorocarbon-based polymer matrix, a chlorine-containing polymer matrix, an epoxy-based polymer matrix, a (meth)acrylate polymer matrix, a polyether polymer matrix, or a combination thereof. In some embodiments the lossy polymeric matrix comprises a fluorocarbon-based polymer matrix or an epoxy-based polymer matrix.

BRIEF DESCRIPTION OF THE DRAWINGS

The present application may be more completely understood in consideration of the following detailed description of various embodiments of the disclosure in connection with the accompanying drawings.

Figure 1:
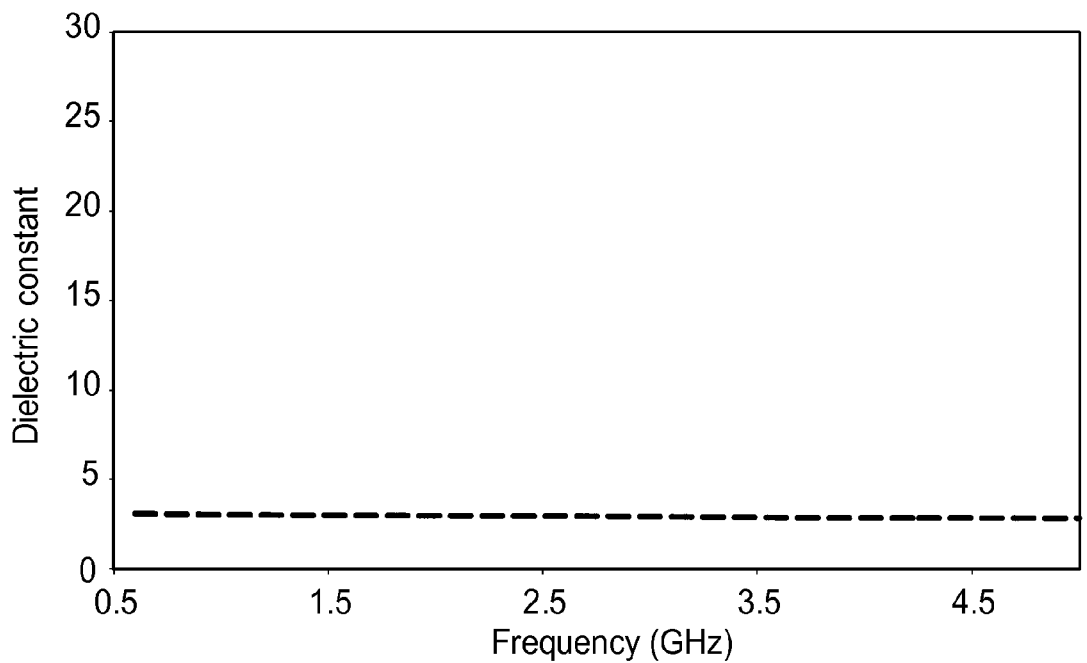
FIG. 1 shows a plot of Dielectric Constant versus Frequency for the sample of Comparative Example C1.

In the following description of the illustrated embodiments, reference is made to the accompanying drawings, in which is shown by way of illustration, various embodiments in which the disclosure may be practiced. It is to be understood that the embodiments may be utilized and structural changes may be made without departing from the scope of the present disclosure. Like numbers used in the figures refer to like components. However, it will be understood that the use of a number to refer to a component in a given figure is not intended to limit the component in another figure labeled with the same number.

DETAILED DESCRIPTION

The need remains for flexible and versatile electromagnetic absorbing materials that can be used to mitigate electromagnetic interference (EMI). These materials should be lightweight, readily handled in industrial processes, and have loss characteristics that are appropriate to the frequency range of interest for a particular application. Disclosed herein are polymeric composites useful as EMI absorbing materials.

The term "composite" as used herein refers to a material in which two or more materials coexist without chemical interaction, and one or more phases can be discrete or continuous.

The term "lossy polymeric matrix" as used herein refers to polymeric matrix that has a dielectric loss tangent in the range from 0.005-0.50 or even 0.01-0.30 over the frequency range of interest. The dielectric loss tangent, typically referred to as tan δ, is a frequency dependent parameter of a dielectric material that quantifies its inherent dissipation of electromagnetic energy. The term refers to the tangent of the angle in a complex plane between the resistive (lossy) component of an electromagnetic field and its reactive (lossless) component. It is conveniently defined as the ratio of the imaginary permittivity of a material to its real permittivity, i.e. tan $\delta = \in''/\in'$.

The terms "polymer" and "polymeric material" refer to both materials prepared from one monomer such as a homopolymer or to materials prepared from two or more monomers such as a copolymer, terpolymer, or the like. Likewise, the term "polymerize" refers to the process of making a polymeric material that can be a homopolymer, copolymer, terpolymer, or the like. The terms "copolymer" and "copolymeric material" refer to a polymeric material prepared from at least two monomers.

The terms "room temperature" and "ambient temperature" are used interchangeably to mean temperatures in the range of 20° C. to 25° C.

The term "fluorocarbon-based" as used herein refers to a material that is fluorinated. Typically, the fluorocarbon-based materials of this disclosure are highly fluorinated.

The term "fluorinated" when used in conjunction with polymer, monomer, or group associated with a polymer or a monomer, refers to having at least one hydrogen atom replaced with a fluorine atom. The term "highly fluorinated" refers to polymers, monomers, or groups where many hydrogen atoms have been replaced with fluorine atoms, in some cases at least half of the hydrogen atoms have been replaced by fluorine atoms, and in other cases, nearly all of the hydrogen atoms have been replaced with fluorine atoms.

The term "(meth)acrylate" as used herein refers to both acrylate and methacrylate materials.

The term "epoxy" as used herein refers to reactive group that is three membered ring including two carbon atoms and an oxygen atom, commonly referred to as an "oxirane ring". The term "epoxy resin" as used herein is in agreement with the generally understood usage for this term in the art and is used to describe curable materials containing one or more epoxy groups.

Disclosed herein are EMI mitigating polymeric composites that comprise a lossy polymeric matrix and one or more type of added particles. In some embodiments, the EMI mitigating polymeric composite comprises a lossy polymeric matrix, ceramic particles dispersed within the polymeric matrix, and conductive particles dispersed within the polymeric matrix. In other embodiments, the EMI mitigating polymeric composite comprises a lossy polymeric matrix and copper oxide (CuO) particles dispersed within the polymeric matrix. Both of these types of EMI mitigating polymeric composites are discussed in greater detail below. Typically, the composite mitigates electromagnetic interference in the 100 MegaHertz-100 GigaHertz range, more typically the 100 MegaHertz-70 GigaHertz range, or even the 1-20 GigaHertz range. These materials are also expected to mitigate electromagnetic interference in lower frequency ranges as well, such as in the kiloHertz and lower MegaHertz bands.

Disclosed herein are EMI mitigating polymeric composites comprising a polymeric matrix having a loss tangent of from 0.005-0.50, or even 0.01-0.30, ceramic particles dispersed within the polymeric matrix, and conductive particles dispersed within the polymeric matrix.

The EMI mitigating polymeric composites comprise a polymeric matrix having a loss tangent of from 0.005-0.50, or even 0.01-0.30. Any polymeric matrix that has the desired intrinsic dielectric loss properties may be suitable as the polymeric matrix for this disclosure. Among the suitable polymeric matrix materials are: materials containing halocarbon groups, that is to say polymeric material that contain C—X, bonds where X is, for example, a fluorine atom or a chlorine atom, such materials include fluorocarbon-based polymers and chlorine-containing polymers; epoxy-based materials, including epichlorohydrin polymers and copolymers as well as epoxy resin polymers; (meth)acrylate polymers and copolymers; and polyether polymers and copolymers. Particularly suitable polymeric matrix materials are epoxy-based polymeric matrices and fluorocarbon-based polymeric matrices.

A variety of parameters control the dielectric loss of polymeric matrices. Some of these parameters relate to structural features of the polymers themselves, others relate to the presence of additives. Examples of structural features of the polymers that affect the dielectric loss of the polymeric matrix include the presence of polar groups, the degree of crystallinity, the glass transition temperature ($T_g$), and the extent of crosslinking. Examples of additives that affect the dielectric loss of the polymeric matrix include, for example, plasticizers which can lower the $T_g$ of the polymeric matrix.

A key component contributing to the dielectric loss in polymers is associated with the relaxation of the short polar segments containing groups with high dipole moments. Some examples of such polarized bonds include: C—OR groups where R is a hydrogen atom or an alkyl or aryl group;

C—X groups where X is a halogen atom such as a fluorine or chlorine atom; and C—NR¹R² where each R¹ and R² group is independently a hydrogen atom, an alkyl group or an aryl group. The polar segments can either be a part of the backbone structure or on a side chain.

The degree of crystallinity is another parameter that affects the dielectric loss in polymers, with less crystalline polymeric matrices having greater dielectric loss, because increased crystallinity reduces the degree of freedom of movement of the polymer chain. In contrast, amorphous polymer matrices have higher free volumes, which enhance the ease of polymer segment rotation and increases dielectric loss due to absorption of electromagnetic energy. Thus polymeric matrices with greater amorphous regions, and consequently lower crystallinity have higher dielectric loss, i.e. are "more lossy". The degree of crystallinity in polymers can be controlled by polymer composition and by the choice of processing conditions.

The mobility of the polymer chains is also affected by the glass transition temperature. Even amorphous polymers with high glass transition temperatures (that is to say $T_g$ values that are greater than the use temperature, generally ambient temperature or room temperature) have restricted mobility at the use temperature. Therefore, polymeric matrices that have $T_g$ values that are lower than the use temperature (generally room temperature) are more lossy than polymer matrices with $T_g$ values that are higher than the use temperature. The $T_g$ of the matrix can also be affected by the use of additives. For example, the $T_g$ of the matrix can be lowered by the addition of plasticizers.

The degree of crosslinking in the matrix is especially important in cured polymeric systems such as cured epoxy resin systems. A higher level of crosslinking adversely affects chain segment mobility, and thus lowers the dielectric loss of the matrix. Thus lower levels of crosslinking are generally desirable for cured polymeric systems.

In addition to the above factors, the lossiness of polymeric systems are also affected by factors such as the degree of branching (as branching tends to break up crystallinity), the nature of the resulting end-groups (whether polar or non-polar), the presence of impurities or additives such as unreacted monomers, solvents such as water, processing aids such anti-oxidants, and the like.

As stated above, among the suitable polymeric matrix materials are: materials containing halocarbon groups, that is to say polymeric material that contain C—X, bonds where X is, for example, a fluorine atom or a chlorine atom; epoxy-based materials, including epichlorohydrin polymers and copolymers as well as epoxy resin polymers; (meth) acrylate polymers and copolymers; and polyether polymers and copolymers.

Examples of polymeric materials containing halocarbon groups include a wide range of chlorine-containing and fluorine-containing polymers. Examples of suitable chlorine-containing polymers include polyvinyl chloride polymers (PVCs) and polyvinylidene chloride polymers (PVDC). PVC polymers contain polar C—Cl groups, but tend to have relatively high $T_g$ values (up to 95° C.) and thus show only moderate dielectric loss properties. PVDC polymers on the other hand not only contain polar C—Cl groups, but also have relatively low $T_g$ values (−17° C.). A wide variety of fluorine-containing polymers are suitable. Among the suitable fluorine-containing polymers are polyvinylidene fluoride (PVDF) polymers and copolymers. PVDF polymers have a very low $T_g$ value (−65° C.). Particularly suitable examples of PVDF and other fluorine-containing polymers including copolymers prepared from the fluorocarbon-based monomers tetrafluoroethylene (TFE), hexafluoropropylene (HFP), as well as vinylidene fluoride (VDF) are described in greater detail below.

Examples of epoxy-based polymeric matrix materials include a wide range of epichlorohydrin-based polymers and epoxy resin based polymers. Examples of epichlorohydrin-based polymers include both poly-epichlorohydrin such as the epichlorohydin homopolymer commercially available from Zeon Chemical as HYDRIN H (CO), and epichlorohydrin copolymers such as the copolymer of epichlorohydrin and ethylene oxide commercially available from Zeon Chemical as HYDRIN C (ECO), and the terpolymer of epichlorohydrin, ethylene oxide, and allyl glycidyl ether commercially available from Zeon Chemical as HYDRIN T. A wide range of curable epoxy resins are suitable, including ones based upon bisphenol-A, bisphenol-F, and phenol novolacs. Particularly suitable epoxy resin systems are described in greater detail below.

Examples of suitable (meth)acrylate polymers and copolymers include polymethyl acrylate polymers (PMA) and polymethyl methacrylate polymers (PMMA) which demonstrate a high degree of amorphous content, polar groups from the (meth)acrylate functionality, and generally show moderate dielectric loss at room temperature.

Polyether polymers and copolymers tend to have desirable dielectric loss values because the C—O—C bonds of the backbone not only are polar groups as described above but they also have a great deal of flexibility. Additionally, polyether polymers and copolymers have low $T_g$ values (generally ~−70° C.). A wide variety of polyether polymers and copolymers are commercially available including, for example, polyethylene oxide polymers and copolymers, and polypropylene oxide polymers and copolymers.

For a variety of reasons, epoxy-based polymeric matrices and fluorocarbon-based polymeric matrices are particularly suitable polymeric matrix materials. These reasons include not only the desirable lossy properties of the polymeric matrices, but also stability over time, availability of materials, handling properties, and the like.

Examples of suitable epoxy-based polymeric matrices include those prepared from epoxy resins based upon bisphenol-A, bisphenol-F, phenol novolacs, or combinations thereof. Examples of suitable epoxy resins based upon bisphenol-A include: EPON 828 (liquid epoxy resin) and EPON 1001F (solid epoxy resin), commercially available from Momentive Specialty Chemicals, Columbus, Ohio; DER 6508 (high molecular weight epoxy resin) commercially available from Dow Chemical Company, Midland Mich.; and EPDXICURE resin (a low molecular weight epoxy resin) commercially available from Buehler, Lake Bluff, Ill. An example of a suitable bisphenol-F epoxy resin is EPON 862 (a low molecular weight epoxy resin) commercially available from Momentive Specialty Chemicals, Columbus, Ohio Examples of suitable epoxy resins based upon phenol novolacs include: EPON 1050, commercially available from Momentive Specialty Chemicals, Columbus, Ohio; and ARALDITE ECN 1299 commercially available from Huntsman Advanced Materials Americas, Inc., The Woodlands, Tex. Mixtures or epoxy resins can also be used. The epoxy resins can be cured using a wide variety of curing agents including amine-based curing agents, phenolic curing agents, and anhydride-based curing agents.

A particularly suitable class of materials for use in the polymeric composites of this disclosure is fluorocarbon-based polymeric matrices. These matrices comprise fluorocarbon-based polymers. In some embodiments, the fluorocarbon-based polymeric matrix comprises a single fluorocarbon-based polymer, in other embodiments, the fluorocarbon-based polymeric matrix comprises a mixture of fluorocarbon-based polymers.

Examples of suitable fluorocarbon-based polymers include those copolymers prepared from the fluorocarbon-based monomers tetrafluoroethylene (TFE), hexafluoropropylene (HFP), and vinylidene fluoride (VDF). Examples of such polymers are described in U.S. Pat. No. 6,310,141 (Chen et al.). Examples of suitable fluorocarbon-based polymers include, for example, terpolymers of 20-60 wt. % TFE, 30-50 wt. % HFP, and 10-40% VDF. These terpolymers are commercially available from 3M Corp, St. Paul, Minn. under the trade name "THV". Additional examples include hexafluoropropylene-tetrafluoroethylene-ethylene (HTE) terpolymers, ethylene-tetrafluoroethylene (ETFE) copolymers, hexafluoropropylene-tetrafluoroethylene (FEP), and tetrafluoroethylene-perfluoro(alkoxy alkane) (PFA) copolymers. These copolymers are also available from 3M Corp, St. Paul, Minn.

A particularly useful class of fluorocarbon-based polymers is VDF-containing fluorocarbon-based polymers. Examples include the materials THV 200, THV 400, THV 500G commercially available from 3M Corp, St. Paul, Minn.; KYNAR 720, KYNAR 740, KYNAR 1000HD, and KYNAR ADX commercially available from ARKEMA, Philadelphia, Pa.; HYLAR 700 commercially available from Ausimont USA Inc., Morristown, N.J.; and FLUOREL FC-2178 commercially available from 3M Corp, St. Paul, Minn. Particularly useful are the poly-VDF polymers KYNAR 720, KYNAR 740, KYNAR 1000HD, and KYNAR ADX commercially available from ARKEMA, Philadelphia, Pa.

Besides the lossy polymeric matrix described above, some embodiments of the EMI mitigating polymeric composites also comprise ceramic particles dispersed within the polymeric matrix. These ceramic particles are lossy dielectric ceramic particles. A wide range of ceramic particles are suitable. Suitable ceramic particles include metal oxide particles, metal nitride particles, metal carbide particles, metal sulfide particles, metal silicide particles, metal boride particles, particles of multiferroic compounds, mixed ceramic particles, chalcogenide glass particles, or a combination thereof. Each of these materials is described in greater detail below.

Typically the particles range in size from an average particle size of 50 nanometers-50 micrometers, more typically 1-10 micrometers and the ceramic particles are generally present in an amount 10-90 weight %, more typically 10-80 weight %.

A wide variety of metal oxide particles are suitable for use in the composites of this disclosure. Examples of suitable metal oxide particles include doped and undoped particles of tin oxide, iron oxide (ferrous or ferric oxide), zinc oxide, manganese oxide, lead oxide, nickel oxide, cobalt oxide, silver oxide, antimony oxide, and copper oxide (CuO). Mixtures of metal oxide particles are also suitable.

Examples of metal nitride particles that are suitable include doped and undoped particles of tantalum nitride, titanium nitride, vanadium nitride, and zirconium nitride. Mixtures of metal nitride particles are also suitable.

Examples of metal carbide particles that are suitable include doped and undoped particles of tungsten carbide, niobium carbide, titanium carbide, vanadium carbide, molybdenum carbide, silicon carbide, zirconium carbide, boron carbide, and titanium silicon carbide. Mixtures of metal carbide particles are also suitable.

Examples of metal sulfide particles that are suitable include doped and undoped particles of copper sulfide, silver sulfide, iron sulfide, nickel sulfide, cobalt sulfide, lead sulfide, and zinc sulfide. Mixtures of metal sulfide particles are also suitable.

Examples of metal silicide particles that are suitable include doped and undoped particles of chromium silicide, molybdenum silicide, cobalt silicide, vanadium silicide, tungsten silicide, and titanium silicide. Mixtures of metal silicide particles are also suitable.

Examples of metal boride particles that are suitable include doped and undoped particles of chromium boride, molybdenum boride, titanium boride, zirconium boride, niobium boride, and tantalum boride. Mixtures of metal boride particles are also suitable.

Examples of particles of multiferroic compounds that are suitable include doped and undoped particles of bismuth ferrite ($BiFeO_3$), bismuth manganate ($BiMnO_3$), and rare earth-iron oxides ($MFe_2O_4$ where M is a rare earth element, such as, for example, $LuFe_2O_4$). Mixtures of particles of multiferroic compounds are also suitable.

Examples of mixed ceramic particles include particles with a mixture of metal or metalloid elements. Suitable examples include doped and undoped particles of silicon carbide and beryllium oxide, silicon carbide and aluminum nitride, copper oxide (CuO) and aluminum oxide, aluminum nitride and glassy carbon, and Si—Ti—C—N ceramics.

Examples of chalcogenide glass particles include glassy materials based on As—Ge—Te and Se—Ge—Te.

Particularly suitable for use in the composites of this disclosure are metal oxide particles, especially copper oxide (CuO).

Besides the lossy polymeric matrix and ceramic particles discussed above, some embodiments of this disclosure include composites that also comprise conductive particles dispersed within the polymeric matrix. A wide range of conductive particles are suitable. Suitable conductive particles include carbon black, carbon bubbles, carbon foams, graphene, carbon fibers, graphite, graphite nanoplatelets, carbon nanotubes, metal particles and nanoparticles, metal alloy particles, metal nanowires, PAN fibers, conductive-coated particles (such as, for example, metal coated glass particles), or a combination thereof. In some embodiments, carbon black is particularly suitable.

Typically the conductive particles range in size from an average particle size of 5 nanometers-20 micrometers, more typically 5-500 nanometers and the conductive particles are generally present in an amount 0.05-20 weight %, more typically 0.05-3 weight %.

Examples of particularly suitable embodiments of composites of this disclosure include those where the polymeric matrix comprises a terpolymer of tetrafluoroethylene, hexafluoropropylene, and vinylidene fluoride, the ceramic particles comprise copper oxide (CuO) particles, and the conductive particles comprise carbon black. Other particularly suitable embodiments of composites of this disclosure include those where the polymeric matrix comprises a vinylidene fluoride polymer (PVDF), the ceramic particles comprise copper oxide (CuO) particles, and the conductive particles comprise carbon black.

Other particularly suitable embodiments of composites of this disclosure include those where the polymeric matrix comprises epoxy resins including bisphenol-A epoxy resins, bisphenol-F epoxy resins, or phenol novolac epoxy resins, or a combination thereof, the ceramic particles comprise copper oxide (CuO) particles, and the conductive particles comprise carbon black.

Also disclosed are EMI mitigating polymeric composites comprising a lossy polymeric matrix and copper oxide (CuO) particles dispersed within the polymeric matrix. Typically, the composite mitigates electromagnetic interference in the 100 MegaHertz-100 GigaHertz range, more typically the 100 MegaHertz-70 GigaHertz range, or even the 1-20 GigaHertz range. These materials are also expected to mitigate electromagnetic interference in lower frequency ranges as well, such as in the kiloHertz and lower MegaHertz bands.

The EMI mitigating polymeric composites comprise a polymeric matrix having a loss tangent of from 0.005-0.50, or even 0.01-0.30. Any suitable polymeric matrix that has the desired intrinsic dielectric loss properties may be suitable as the polymeric matrix for this disclosure, such as those described above. Among the suitable polymeric matrix materials are epoxy-based polymeric matrices and fluorocarbon-based polymeric matrices.

Examples of suitable epoxy-based polymeric matrices include those prepared from epoxy resins based upon bisphenol-A, bisphenol-F, phenol novolacs, or combinations thereof. Examples of suitable epoxy resins based upon bisphenol-A include: EPON 828 (liquid epoxy resin) and EPON 1001F (solid epoxy resin), commercially available from Momentive Specialty Chemicals, Columbus, Ohio; DER 6508 (high molecular weight epoxy resin) commercially available from Dow Chemical Company, Midland Mich.; and EPDXICURE resin (a low molecular weight epoxy resin) commercially available from Buehler, Lake Bluff, Ill. An example of a suitable bisphenol-F epoxy resin is EPON 862 (a low molecular weight epoxy resin) commercially available from Momentive Specialty Chemicals, Columbus, Ohio Examples of suitable epoxy resins based upon phenol novolacs include: EPON 1050, commercially available from Momentive Specialty Chemicals, Columbus, Ohio; and ARALDITE ECN 1299 commercially available from Huntsman Advanced Materials Americas, Inc., The Woodlands, Tex. Mixtures or epoxy resins can also be used. The epoxy resins can be cured using a wide variety of curing agents including amine-based curing agents, phenolic curing agents, and anhydride-based curing agents.

A particularly suitable class of materials for use in the polymeric composites of this disclosure is fluorocarbon-based polymeric matrices. These matrices comprise fluorocarbon-based polymers. In some embodiments, the fluorocarbon-based polymeric matrix comprises a single fluorocarbon-based polymer, in other embodiments, the fluorocarbon-based polymeric matrix comprises a mixture of fluorocarbon-based polymers.

Examples of suitable fluorocarbon-based polymers include those copolymers prepared from the fluorocarbon-based monomers tetrafluoroethylene (TFE), hexafluoropropylene (HFP), and vinylidene fluoride (VDF). Examples of such polymers are described in U.S. Pat. No. 6,310,141 (Chen et al.). Examples of suitable fluorocarbon-based polymers include, for example, terpolymers of 20-60 wt. % TFE, 30-50 wt. % HFP, and 10-40% VDF. These terpolymers are commercially available from 3M Corp, St. Paul, Minn. under the trade name "THV". Additional examples include hexafluoropropylene-tetrafluoroethylene-ethylene (HTE) terpolymers, ethylene-tetrafluoroethylene (ETFE) copolymers, hexafluoropropylene-tetrafluoroethylene (FEP), and tetrafluoroethylene-perfluoro(alkoxy alkane) (PFA) copolymers. These copolymers are also available from 3M Corp, St. Paul, Minn.

A particularly useful class of fluorocarbon-based polymers is VDF-containing fluorocarbon-based polymers. Examples include the materials THV 200, THV 400, THV 500G commercially available from 3M Corp, St. Paul, Minn.; KYNAR 720, KYNAR 740, KYNAR 1000HD, and KYNAR ADX commercially available from ARKEMA, Philadelphia, Pa.; HYLAR 700 commercially available from Ausimont USA Inc., Morristown, N.J.; and FLUOREL FC-2178 commercially available from 3M Corp, St. Paul, Minn. Particularly useful are the poly-VDF polymers KYNAR 720, KYNAR 740, KYNAR 1000HD, and KYNAR ADX commercially available from ARKEMA, Philadelphia, Pa.

Suitable copper oxide (CuO) particles typically range in size from an average particle size of 50 nanometers-50 micrometers, more typically 1-10 micrometers and the copper oxide (CuO) particles are generally present in an amount 10-90 weight %, more typically 10-80 weight %.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted. The following abbreviations are used: cm=centimeters; mm=millimeters; phr=parts per 100 parts resin; ml=milliliters. The terms "weight %", "% by weight", and "wt %" are used interchangeably.

Table of Abbreviations

| Abbreviation | Description |
| --- | --- |
| CuO Filler | Copper Oxide powder, high purity (98%) |
| CB Filler-1 | Conductive carbon black filler, commercially available as "KETJENBLACK EC-300J" from AkzoNobel Polymer Chemicals LLC, Chicago, IL |
| CB Filler-2 | Conductive carbon black filler, commercially available as "KETJENBLACK EC-600JD" from AkzoNobel Polymer Chemicals LLC, Chicago, IL |
| PVDF | Polyvinylidene fluoride polymer, commercially available as "KYNAR 720" from Arkema, Colombes, France |
| DMF | N, N-Dimethylformamide solvent, available from EMD Chemicals, Inc., Gibbstown, NJ |
| FS | Fluorosurfactant dispersant commercially available as "NOVEC FC-4430" from 3M Company, St. Paul, MN |
| Primer | Primer, commercially available as "94 PRIMER" from 3M Company, St. Paul, MN |
| PI Film | Polyimide film, polymer sheets with a thickness of 125 micrometers, commercially available as "KAPTON 500H" from DuPont, Wilmington, DE |

-continued

| Table of Abbreviations | |
|---|---|
| Abbreviation | Description |
| Surfactant | Surfactant solution of 50% active polymeric dispersant in n-butyl acetate, commercially available as "SOLSPERSE 76500" from The Lubrizol Corporation, Wickliffe, OH |
| Aluminum Plate | Aluminum plate, 10 cm × 10 cm, 1-2 mm thick |
| Laboratory Press | Laboratory press, available from Carver, Inc., Wabash, IN, model no. 2699 |
| Network Analyzer | Network analyzer, available from Agilent Technologies, Santa Clara, CA, model no. E8363C |
| Air Coax Test Fixture | Air coax test fixture, available from Damaskos, Inc., Concordville, PA, model no. 100T |
| Twin Screw Extruder | Twin screw extruder, available from B&P Process Equipment and Systems LLC, Saginaw, MI, model no. MP-2019 15:1 |
| Annular Steel Mold | Annular steel mold, outer diameter 2.54 cm, inner diameter 1.10 cm, custom-manufactured |
| Manual Hydraulic Press | Manual hydraulic press, available from Carver, Inc., Wabash, IN, model no. 32000 |
| Milling Machine | Milling machine, available under the trade designation BRIDGEPORT from Hardinge, Inc., Elmira, NY |
| Carbide Tool | Carbide tool, available from Travers Tool Company, Inc. Flushing, NY, tool no. BL5-C6 |

SYNTHESIS EXAMPLES

The following Epoxy Resin Compositions were prepared and used:

Synthesis Example S1: Epoxy Resin System-1

Epoxy Resin System-1 was a mixture of 100.00 parts by weight epoxy resin (EPDXICURE Resin (low molecular weight bisphenol A-based epoxy resin, commercially available from Buehler, Lake Bluff, Ill.), and 18.00 phr epoxy curing agent (EPDXICURE Hardener (a mixture of aliphatic amines) commercially available from Buehler, Lake Bluff, Ill.).

Synthesis Example S2: Epoxy Resin System-2

Epoxy Resin System-2 was a mixture of 100.00 parts by weight epoxy resin (EPON 862, low molecular weight bisphenol F-based epoxy resin, commercially available from Momentive Specialty Chemicals, Inc., Columbus, Ohio), and 46.50 phr epoxy curing agent (EPIKURE 3233 (polyoxypropylenetriamene) commercially available from Momentive Specialty Chemicals, Inc., Columbus, Ohio).

Synthesis Example S3: Epoxy Resin System-3

Epoxy Resin System-3 was a mixture of 100.00 parts by weight epoxy resin (D.E.R. 6508, high molecular weight bisphenol A-based epoxy resin, commercially available from The Dow Chemical Company, Midland, Mich.), and a curative mixture of: a) 8.46 phr epoxy curing agent, (D.E.H. 85 (phenolic) commercially available from The Dow Chemical Company, Midland, Mich.); b) 2.59 phr epoxy curing agent, (DYHARD 100 (amine) commercially available from AlzChem LLC, Atlanta, Ga.); and c) 1.32 phr epoxy curing accelerator, (EPIKURE P-100 commercially available from Momentive Specialty Chemicals, Inc., Columbus, Ohio).

Synthesis Example S4: Epoxy Resin System-4

Epoxy Resin System-4 was a mixture of 100.00 parts by weight epoxy resin (ARALDITE ECN 1299 from Huntsman Advanced Materials Americas, Inc., The Woodlands, Tex.), and a curative mixture of: a) 68.48 phr epoxy curing agent, (BTDA, 3,3',4,4'-benzophenone tetracarboxylic dianhydride (anhydride), commercially available from Evonik Industries, Essen, Germany); and b) 1.70 phr epoxy curing accelerator, (EPIKURE P-100 commercially available from Momentive Specialty Chemicals, Inc., Columbus, Ohio).

Synthesis Example S5: Primed PI Film

Primed PI film was prepared by cleaning the PI Film with ethanol, drying, applying a of a very thin coating of the Primer by rubbing the PI Film with a wiper soaked with the Primer, allowing the primer to dry for at least 1 hour in air, and then drying overnight in an air-ventilated hood.

Comparative Example C1

Figure 2:
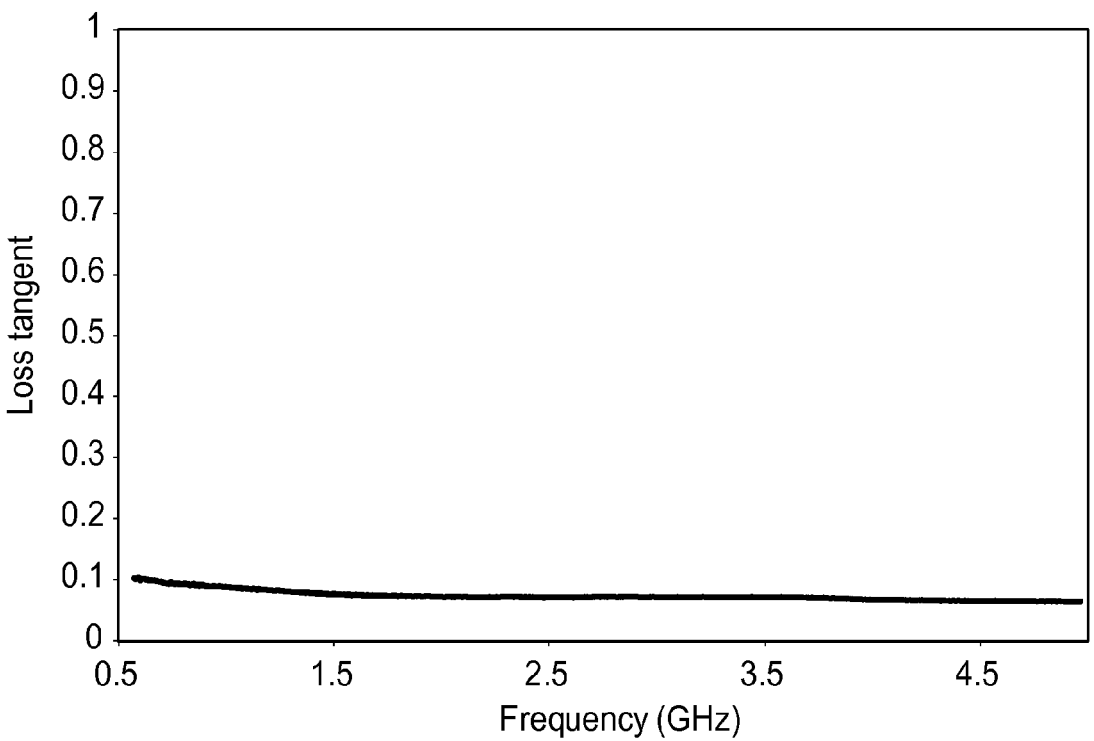
FIG. 2 shows a plot of Loss Tangent versus Frequency for the sample of Comparative Example C1.

A sample of the PVDF polymer with no fillers was prepared and analyzed. A predetermined quantity of the PVDF polymer was placed in a glass beaker and heated to a temperature of 250° C. for 10 minutes on a hot plate. The resulting fluid was poured onto an Aluminum Plate and hot pressed at a temperature of 175° C. and a pressure of 6 metric tons for 15 minutes using the Laboratory Press. The hot pressed polymer sheet was allowed to cool to room temperature and cut into a toroid or doughnut-shaped sample having an outer diameter of 2.54 cm and an inner diameter of 1.10 cm, with a thickness of 1-2 mm. Complex dielectric properties were calculated over the frequency range from S-parameters obtained using the Network Analyzer coupled with the Air Coax Test Fixture. The results are shown in FIGS. 1 and 2, illustrating the dielectric constant vs. the frequency and the loss tangent vs. the frequency, respectively, of the sample. The dielectric constant of the sample is about 3.0 over the frequency range (FIG. 1), the loss tangent is about 0.1 in the low frequency range (FIG. 2), demonstrating that PVDF polymers are intrinsically lossy polymer materials.

Example 1

A sample of the PVDF polymer with 16.25 wt % CuO Filler and 0.34 wt % CB Filler-1 was prepared and analyzed.

Figure 3:
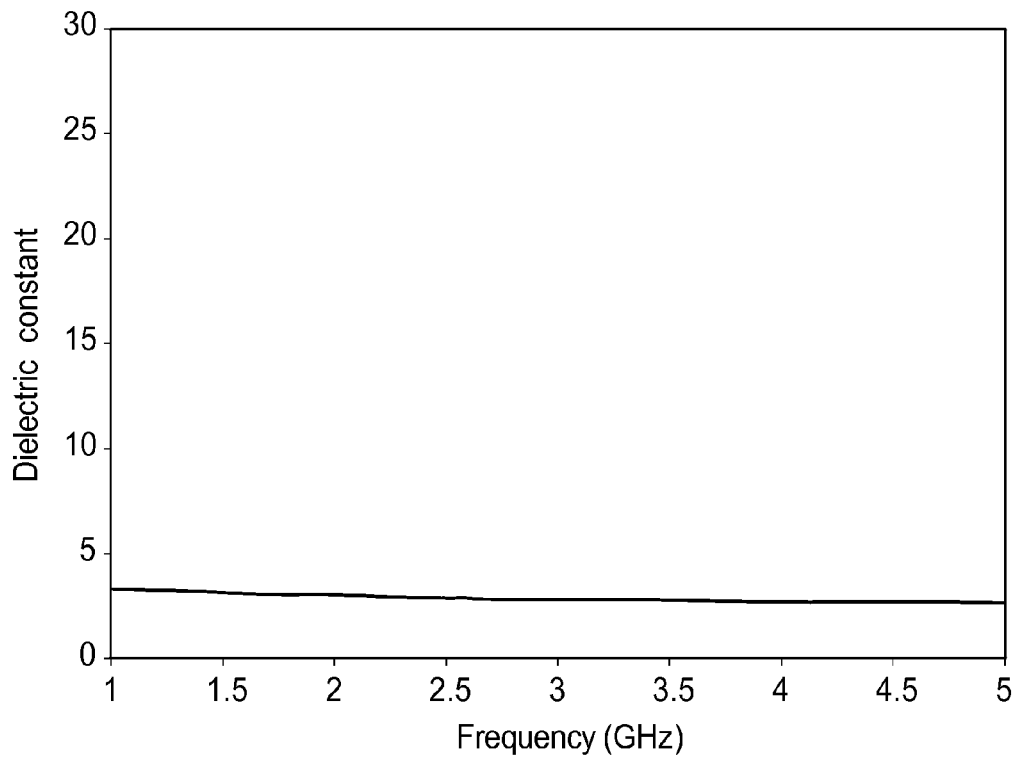
FIG. 3 shows a plot of Dielectric Constant versus Frequency for the sample of Example 1.
Figure 4:
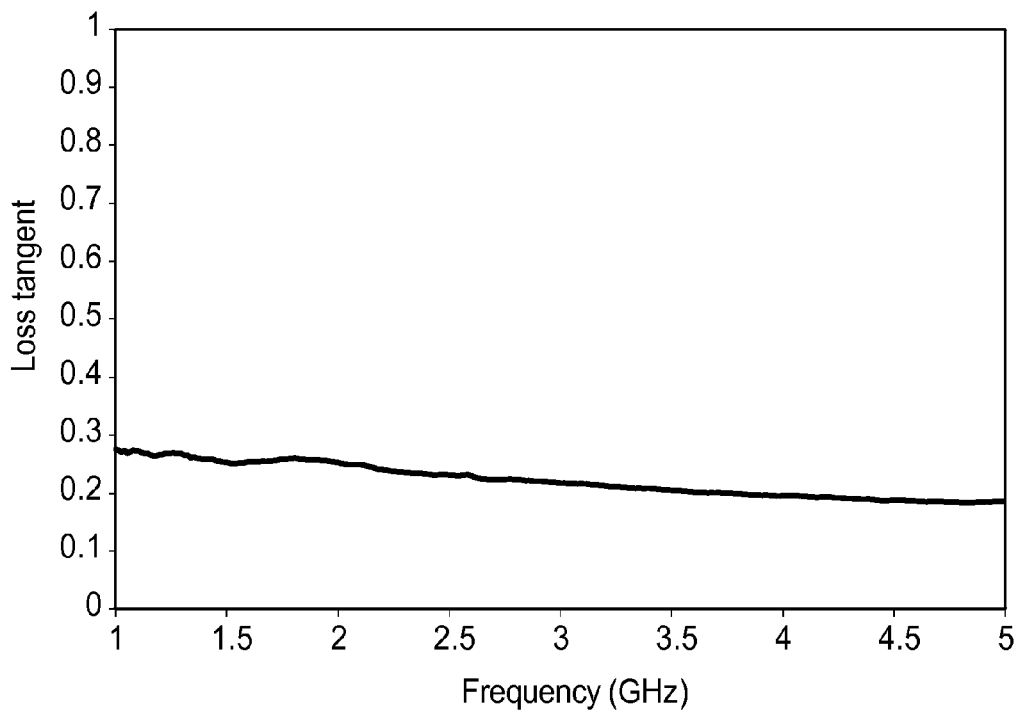
FIG. 4 shows a plot of Loss Tangent versus Frequency for the sample of Example 1.

The CuO Filler and CB Filler-1 were blended with PVDF polymer in a glass beaker at a temperature of 250° C. for 10 minutes on a hot plate. DMF solvent was used to dissolve the PVDF polymer, and a drop of FS dispersant was added to the mixture. The resulting mixture was poured onto the Aluminum Plate and hot pressed at a temperature of 200° C. and a pressure of 6 metric tons for 15 minutes using the Laboratory Press. The hot pressed polymer composite was then allowed to cool to room temperature and cut into a toroid or doughnut-shaped sample having an outer diameter of 2.54 cm and an inner diameter of 1.10 cm, and a thickness of 1-2 mm. Complex dielectric properties were calculated over the frequency range from S-parameters obtained using the Network Analyzer coupled with the Air Coax Test Fixture. The results are shown in FIGS. 3 and 4, illustrating the dielectric constant vs. the frequency and the loss tangent vs. the frequency, respectively, of the sample.

Examples 2-4

Figure 5:
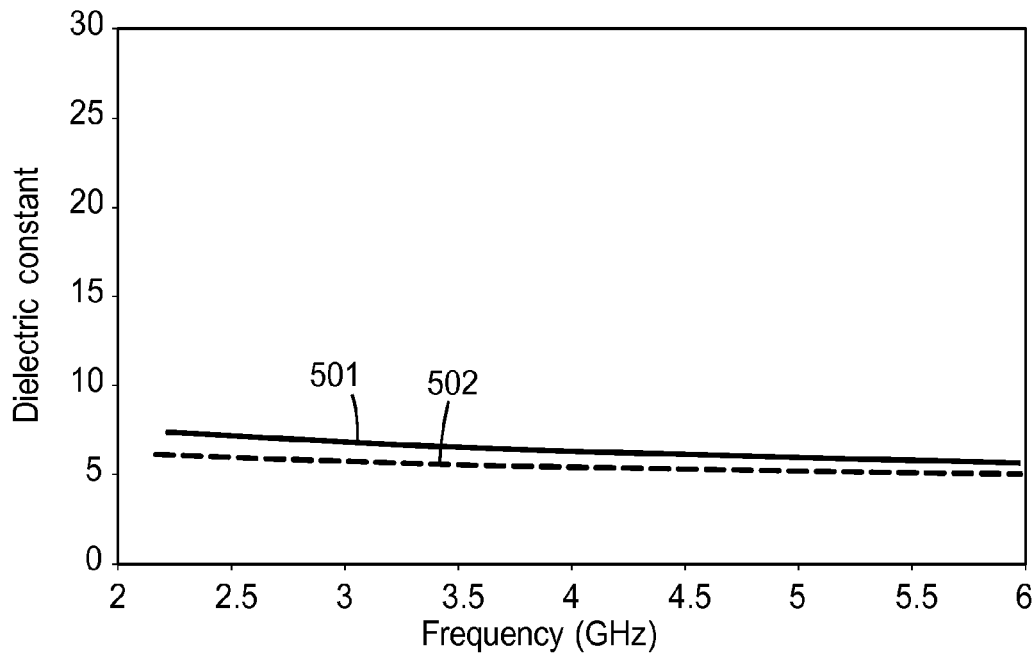
FIG. 5 shows a plot of Dielectric Constant versus Frequency for the samples of Examples 2 and 3.
Figure 6:
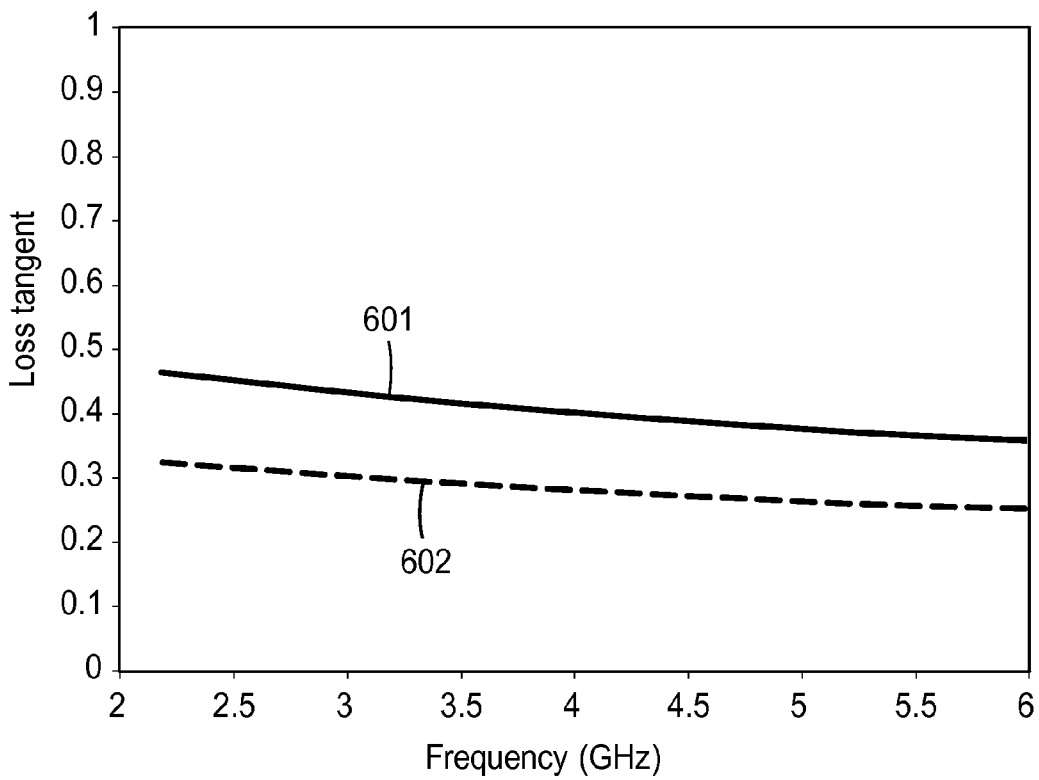
FIG. 6 shows a plot of Loss Tangent versus Frequency for the samples of Examples 2 and 3.

A series of samples were prepared on PI Film were prepared and analyzed: for Example 2 PVDF polymer with 60.0 wt % CuO Filler on PI film; for Example 3 PVDF polymer with 74.16 wt % CuO Filler on PI film; and for Example 4 PVDF polymer with 57.2 wt % CuO Filler and 0.40 wt % CB Filler-2 on PI Film. For Examples 2 and 3, CuO Filler particles were ground manually in a mortar and pestle, crushed in a high speed mechanical grinder for 5 minutes, and dried for at least 4 hours at 60° C. A PVDF polymer solution was prepared by dissolving 3 g or PVDF in 9 ml of DMF solvent by heating overnight at 65° C. in a closed vial. Dispersions were made by adding small portions of CuO Filler, speed mixing using a high speed mixer, ultrasonication for 5 minutes at a temperature of 60° C. using an ultrasonicator, and heating at a temperature of 65° C. using the hot plate. Once a uniform suspension with a viscosity suitable for coating was obtained, the suspension was coated on primed PI Film using a wet film applicator with a 375 micrometer (15 mil) clearance setting. To densify the coated sample and reduce porosity, the coated sample was placed in the oven preheated at a temperature of 250° C. After 30 minutes, the oven was shut down and the sample was allowed to air cool. Complex dielectric properties were calculated over the frequency range from S-parameters obtained using the Network Analyzer coupled with the Air Coax Test Fixture. The results are shown in FIGS. 5 and 6, illustrating the dielectric constant vs. the frequency and the loss tangent vs. the frequency, respectively, of Example 2 (501, 601), and Example 3 (502, 602).

Figure 7:
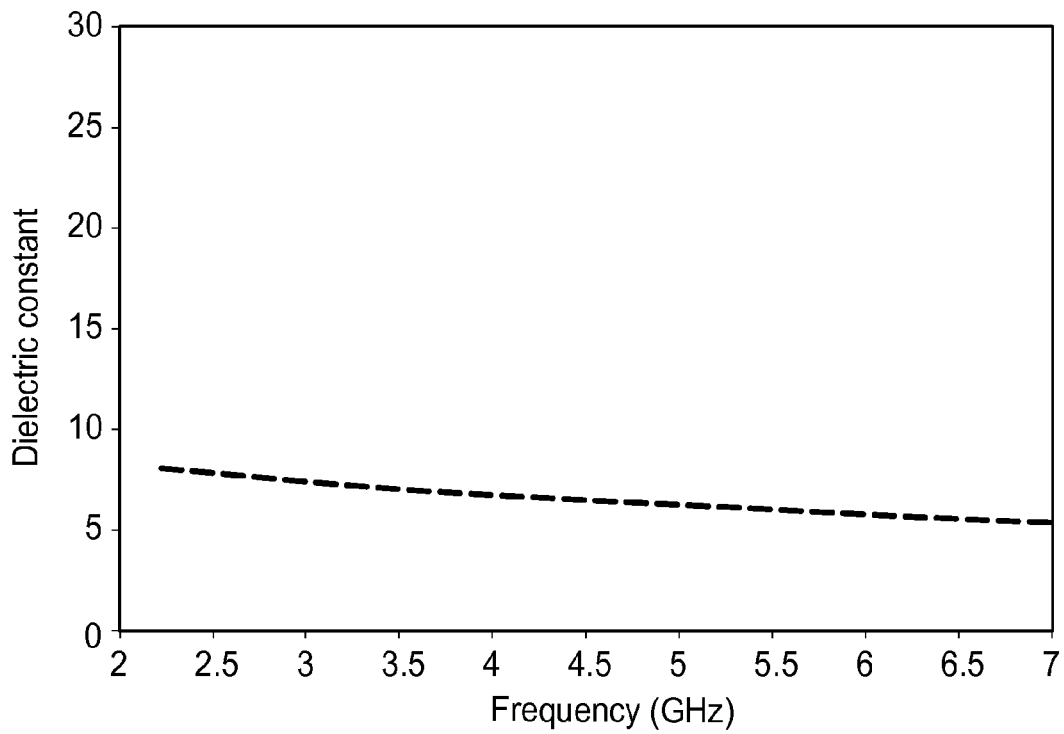
FIG. 7 shows a plot of Dielectric Constant versus Frequency for the sample of Example 4.
Figure 8:
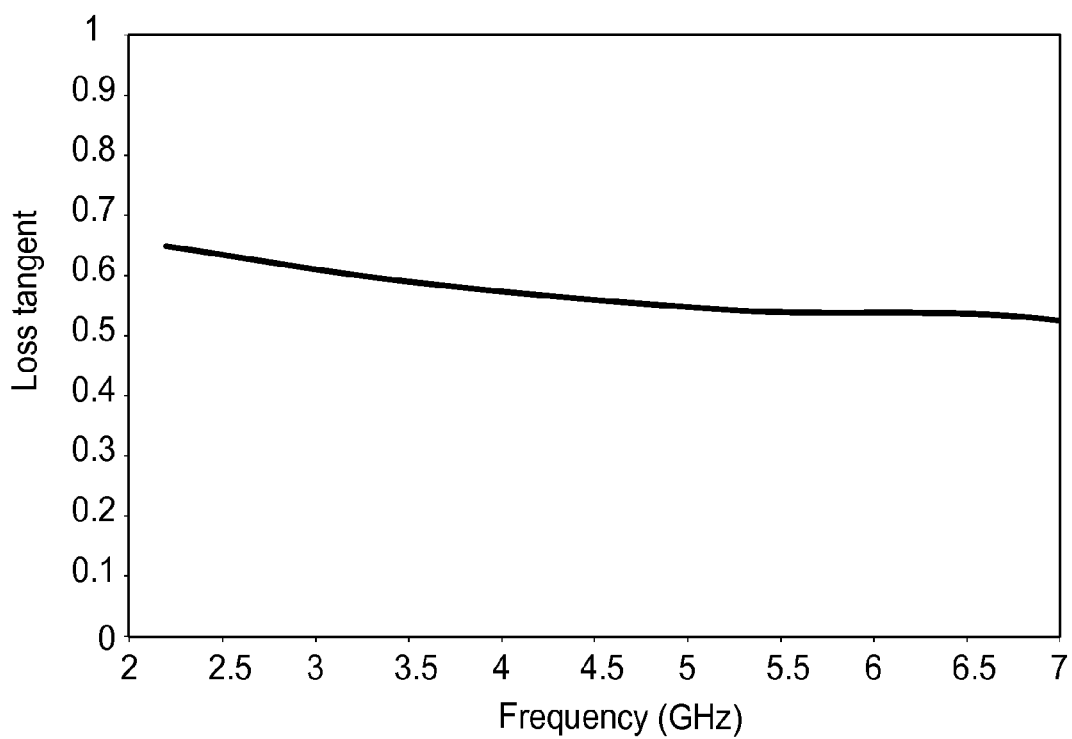
FIG. 8 shows a plot of Loss Tangent versus Frequency for the sample of Example 4.

For Example 4, CuO Filler particles were ground and crushed as described above, and CB Filler-2 pellets were ground in a high speed mechanical grinder for 5 minutes. The resulting powders were dried for at least 4 hours at 60° C. A dispersant stock solution was prepared by dissolving 1.95 grams of FS dispersant in 4 ml of DMF solvent. A PVDF polymer solution was prepared by dissolving 3 g or PVDF in 9 ml of DMF solvent by heating overnight at 65° C. in a closed vial. A dispersion was made by adding small portions of CuO Filler, and CB Filler-2 ground in a mortar and pestle with 150 microliters of dispersant stock solution, and speed mixing using a high speed mixer, ultrasonication for 5 minutes at a temperature of 60° C. using an ultrasonicator, and heating at a temperature of 65° C. using the hot plate. Once a uniform suspension with a viscosity suitable for coating was obtained, the suspension was coated on primed PI Film using a wet film applicator with a 375 micrometer (15 mil) clearance setting. To densify the coated sample and reduce porosity, the coated sample was placed in the oven preheated at a temperature of 250° C. After 30 minutes, the oven was shut down and the sample was allowed to air cool. Complex dielectric properties were calculated over the frequency range from S-parameters obtained using the Network Analyzer coupled with the Air Coax Test Fixture. The results are shown in FIGS. 7 and 8.

Comparative Examples C2-C5

Figure 9:
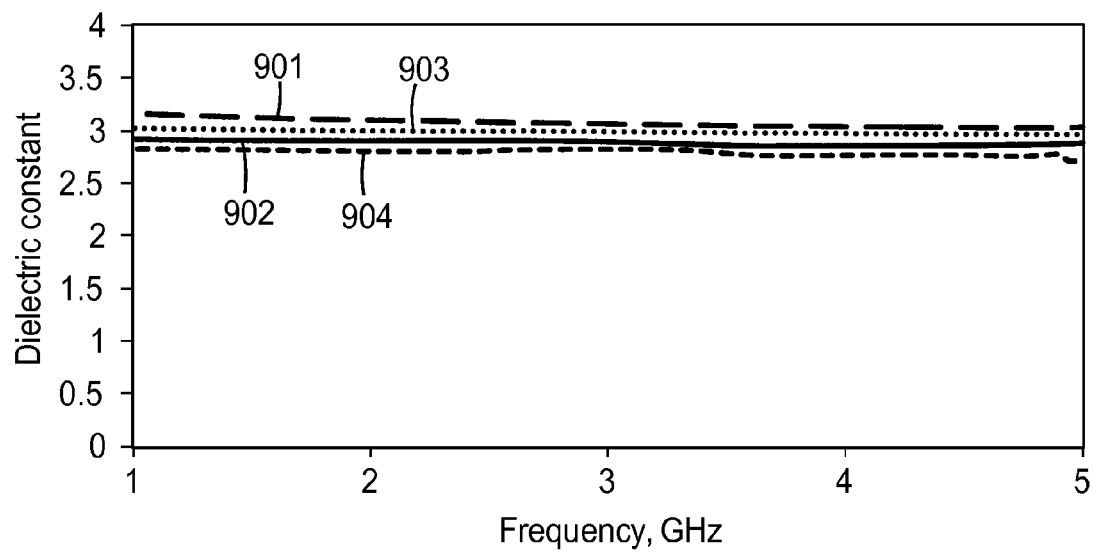
FIG. 9 shows a plot of Dielectric Constant versus Frequency for the samples of Comparative Examples C2-C5.
Figure 10:
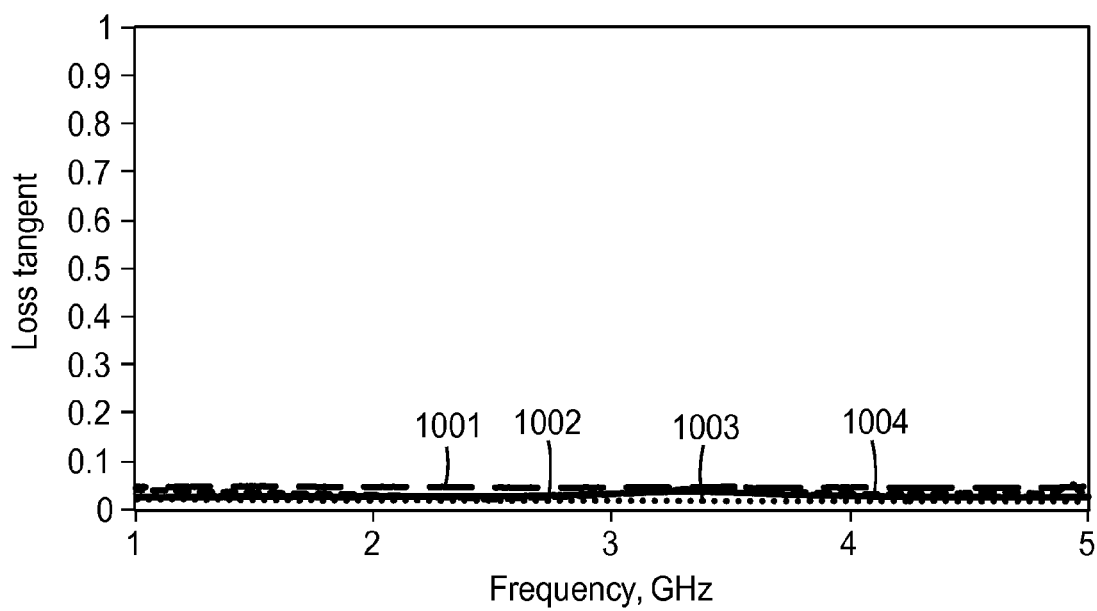
FIG. 10 shows a plot of Loss Tangent versus Frequency for the samples of Comparative Examples C2-C5.

Samples of the epoxy resin systems of Synthesis Examples S1-S4 with no fillers were prepared and analyzed. For Comparative Example C2 (the liquid epoxy resin system of Synthesis Example S1) and Comparative Example C3 (the liquid epoxy resin system of Synthesis Example S2), the epoxy resin and the curing agent were mixed in the high speed mixer and cast in aluminum pans having a 57 mm diameter. Comparative Example C2 was cured at a temperature of 65° C. for 2 hours in an oven. Comparative Example C3 was cured at a temperature of 60° C. for 2 hours followed by post-curing at a temperature of 100° C. for 2 hours. For each example, the cured material was machined into a toroid or doughnut-shaped sample having an outer diameter of 2.54 cm and an inner diameter of 1.10 cm using a Milling Machine with a Carbide Tool. For Comparative Example C4 (the solid epoxy resin system of Synthesis Example S3) and Comparative Example C5 (the solid epoxy resin system of Synthesis Example S4), the epoxy resin and the curing agent were compounded using a Twin Screw Extruder at a temperature of 110° C. For Comparative Example C4, the extruded material was cured at a temperature of 110° C. overnight, and post-cured at a temperature of 200° C. for 15 minutes. The cured material was machined into a toroid shaped sample using method as for Comparative Examples C2 and C3 above. For Comparative Example C5, the extruded material was crushed into powder using a high speed mechanical grinder. The powder was pressed into a toroid or doughnut-shaped pellet having an outer diameter of 2.54 cm and an inner diameter of 1.10 cm using an Annular Steel Mold in a Manual Hydraulic Press at 30,000 psi pressure, and cured in the oven at a temperature of 200° C. for 20 minutes. The samples had a thickness of 2-5 mm. Complex dielectric properties were calculated over the frequency range from S-parameters obtained using the Network Analyzer coupled with the Air Coax Test Fixture. The results are shown in FIGS. 9 and 10, illustrating the dielectric constant vs. the frequency and the loss tangent vs. the frequency, respectively, of Comparative Example C2 (901, 1001), Comparative Example C3 (902, 1002), Comparative Example C4 (903, 1003), and Comparative Example C5 (904, 1004).

Examples 5-7

Figure 11:
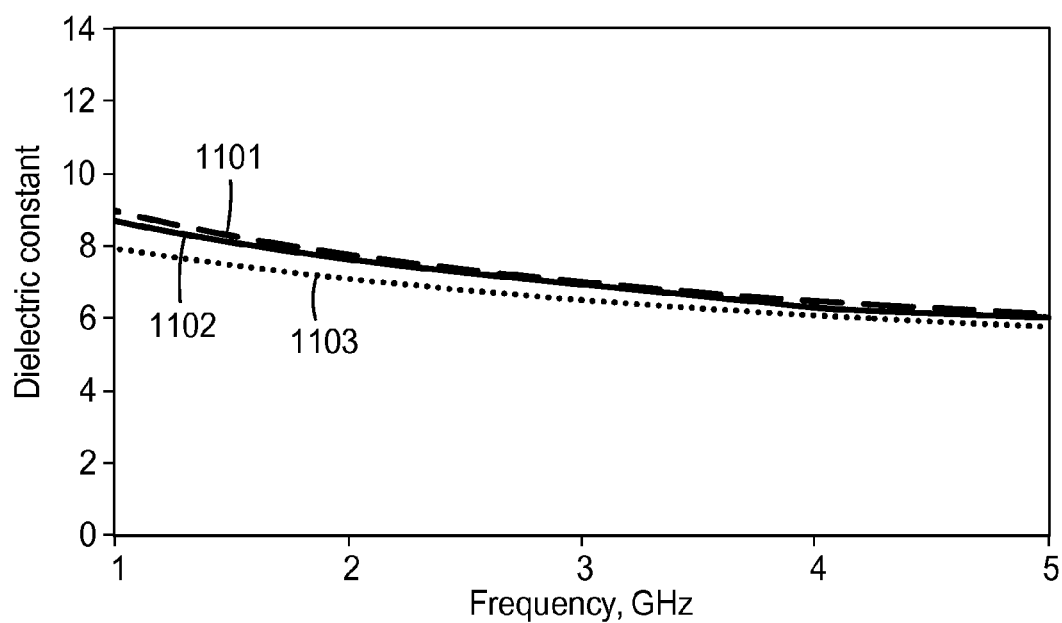
FIG. 11 shows a plot of Dielectric Constant versus Frequency for the samples of Examples 5-7.
Figure 12:
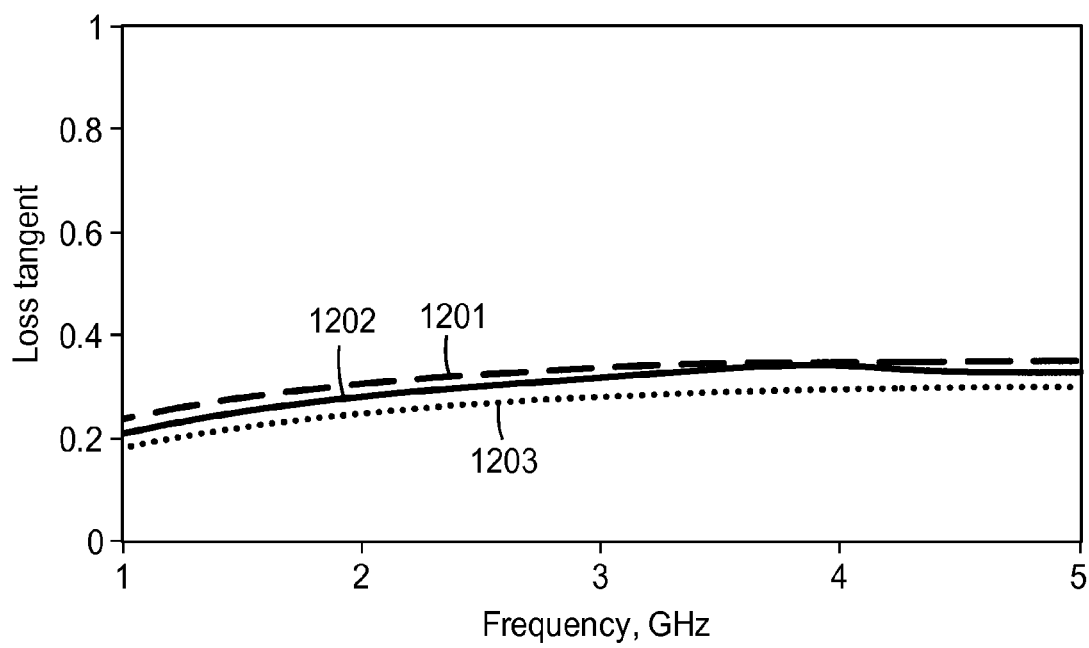
FIG. 12 shows a plot of Loss Tangent versus Frequency for the samples of Examples 5-7.

Samples of the epoxy resin systems of Synthesis Examples S1-S3 with CuO Filler were prepared and analyzed. For Example 5 (the liquid epoxy resin system of Synthesis Example S1 with 64.8 wt % CuO Filler) and Example 6 (the liquid epoxy resin system of Synthesis Example S2 with 65.4 wt % CuO Filler), the epoxy resin and CuO Filler were mixed in a high speed mixer, the curing agent was added and mixed, and the resulting mixture cast in aluminum pans having a 57 mm diameter. Example 5 was cured at a temperature of 65° C. for 2 hours in an oven. Example 6 was cured at a temperature of 60° C. for 2 hours followed by post-curing at a temperature of 100° C. for 2 hours. For each example, the cured material was machined into a toroid or doughnut-shaped sample having an outer diameter of 2.54 cm and an inner diameter of 1.10 cm using a Milling Machine with a Carbide Tool. For Example 7 (the solid epoxy resin system of Synthesis Example S3 with 63.7 wt % CuO Filler), the epoxy resin, CuO Filler, and the curing agent were compounded using a Twin Screw Extruder at a temperature of 110° C. The extruded material was cured at a temperature of 110° C. overnight, and post-cured at a temperature of 200° C. for 15 minutes. The cured material was machined into a toroid shaped sample using method as for Comparative Examples C2 and C3 above. The samples had a thickness of 2-5 mm. Complex dielectric properties were calculated over the frequency range from S-parameters obtained using the Network Analyzer coupled with the Air Coax Test Fixture. The results are shown in FIGS. 11 and 12, illustrating the dielectric constant vs. the frequency and the loss tangent vs. the frequency, respectively, of Example 5 (1101, 1201), Example 6 (1102, 1202), and Example 7 (1103, 1203).

Examples 8-10

Figure 13:
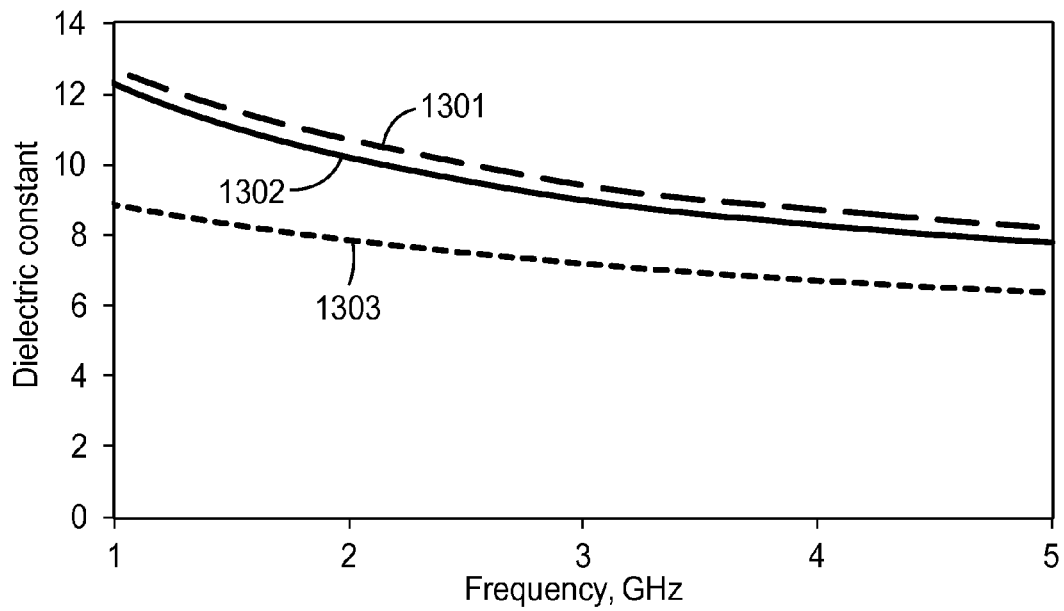
FIG. 13 shows a plot of Dielectric Constant versus Frequency for the samples of Examples 8-10.
Figure 14:
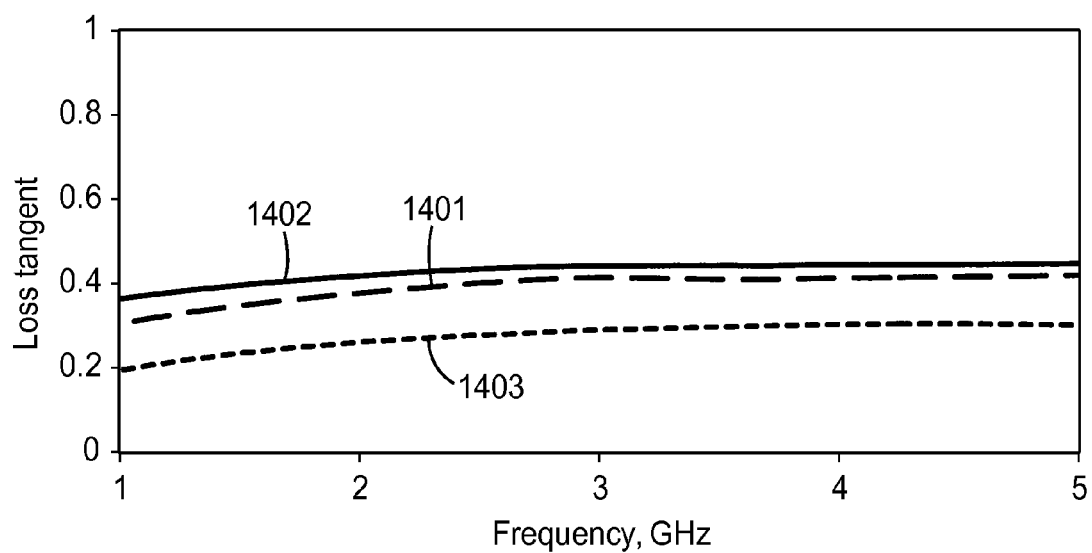
FIG. 14 shows a plot of Loss Tangent versus Frequency for the samples of Examples 8-10.
Figure 15:
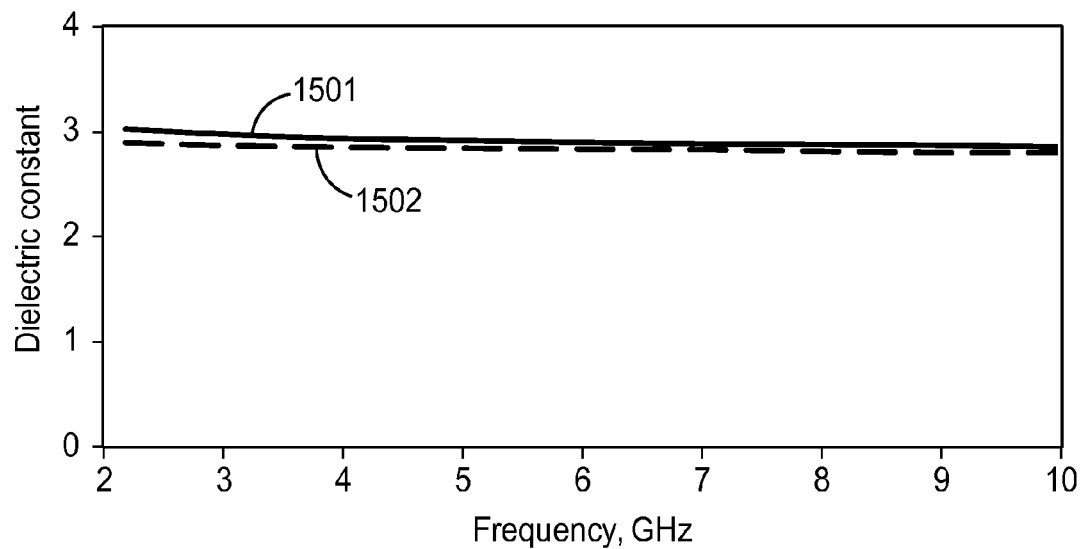
FIG. 15 shows a plot of Dielectric Constant versus Frequency for the samples of Comparative Examples C6 and C7.
Figure 16:
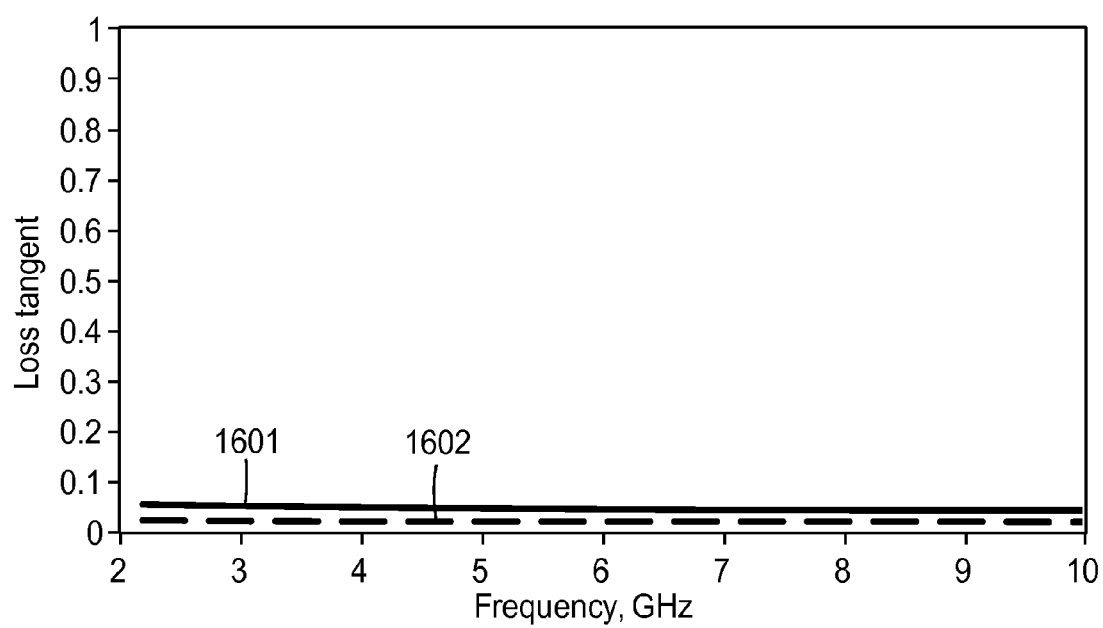
FIG. 16 shows a plot of Loss Tangent versus Frequency for the samples of Comparative Examples C6 and C7.
Figure 17:
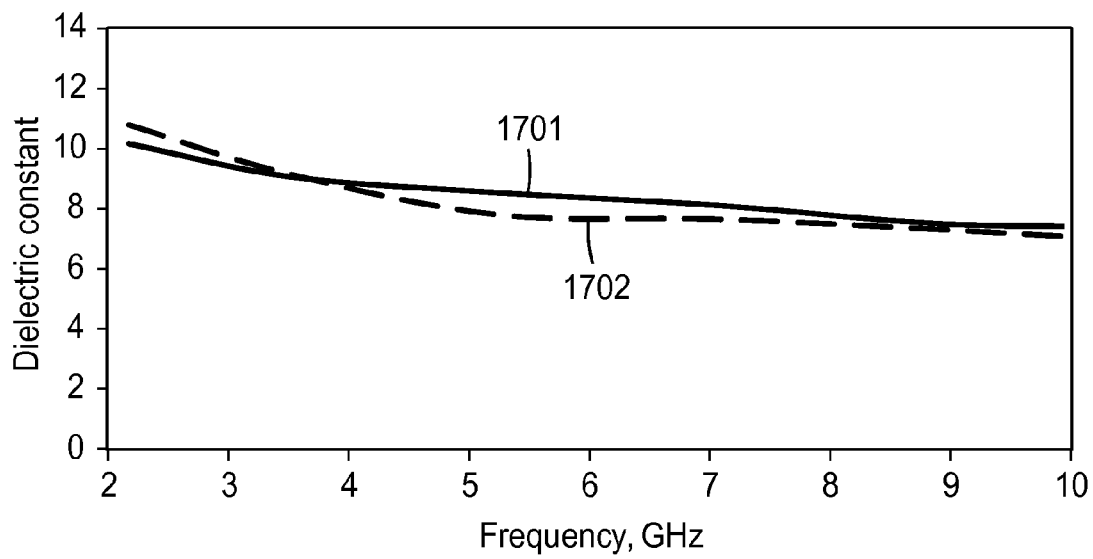
FIG. 17 shows a plot of Dielectric Constant versus Frequency for the samples of Examples 11 and 12.
Figure 18:
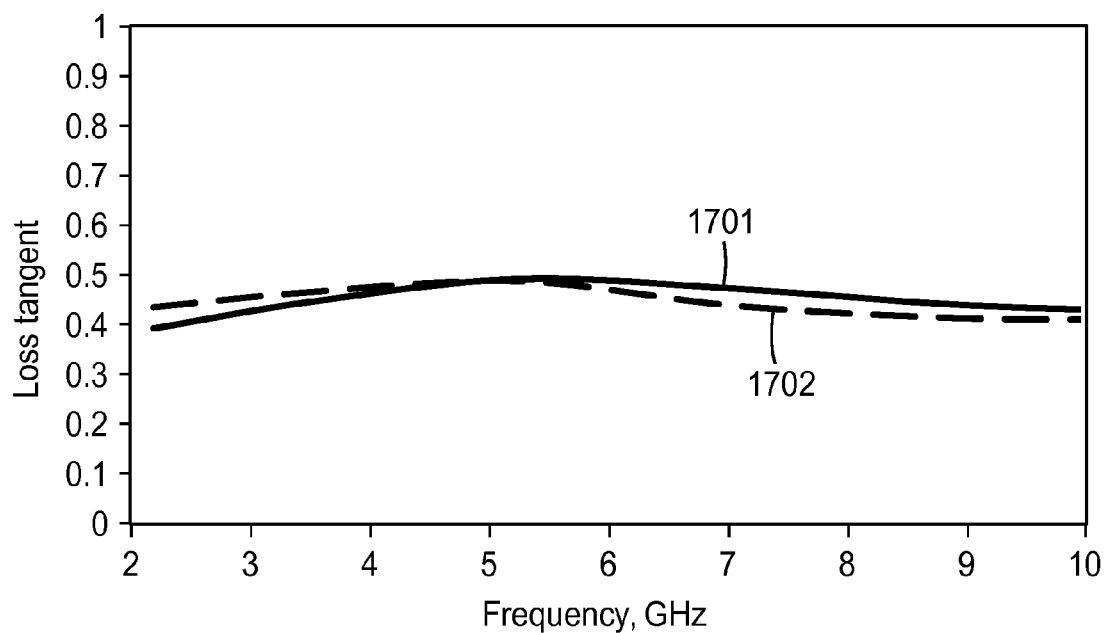
FIG. 18 shows a plot of Loss Tangent versus Frequency for the samples of Examples 11 and 12.
Figure 19:
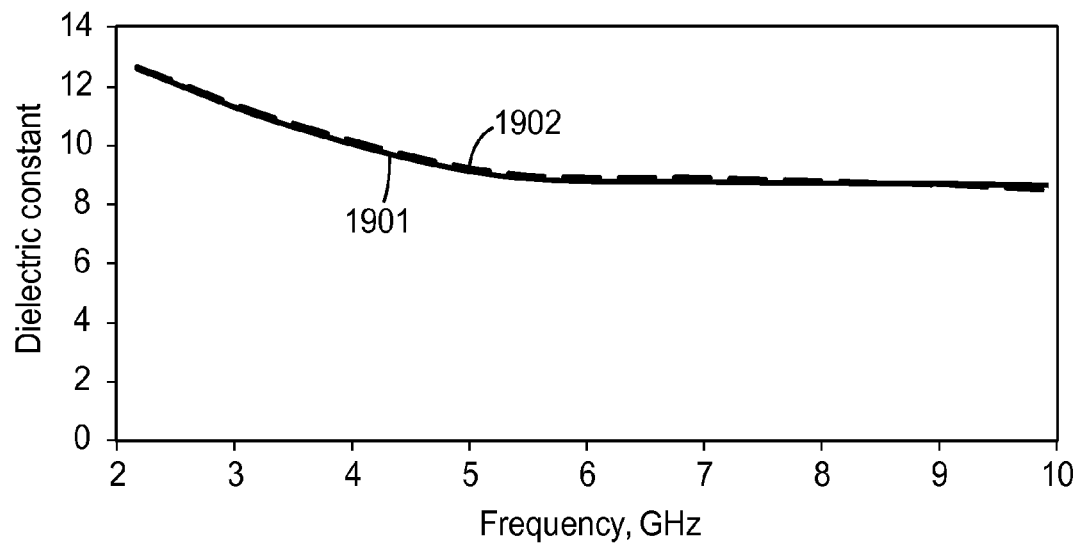
FIG. 19 shows a plot of Dielectric Constant versus Frequency for the samples of Examples 13 and 14.
Figure 20:
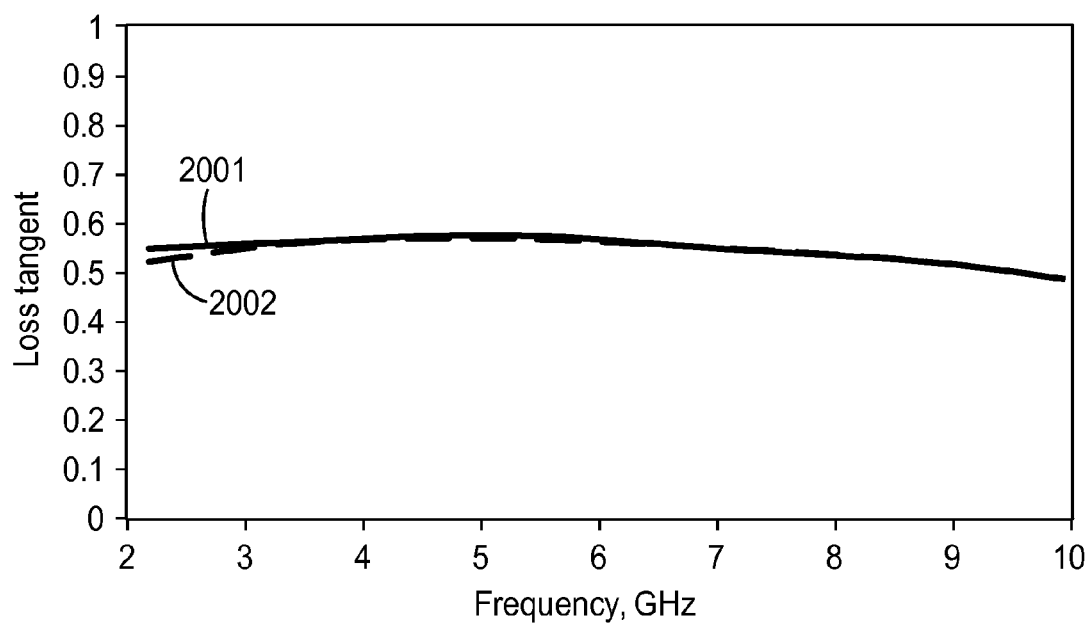
FIG. 20 shows a plot of Loss Tangent versus Frequency for the samples of Examples 13 and 14.

Samples of the epoxy resin systems of Synthesis Examples S1-S3 with CuO Filler and CB Filler-2 were prepared and analyzed. For Example 8 (the liquid epoxy resin system of Synthesis Example S1 with 64.8 wt % CuO Filler and 0.55 wt % CB Filler-2) and Example 9 (the liquid epoxy resin system of Synthesis Example S2 with 65.2 wt % CuO Filler and 0.55 wt % CB Filler-2), the epoxy resin, CuO Filler, CB Filler-2, and 5 wt % Surfactant based on the weight of CB Filler-2 were mixed in a high speed mixer, the curing agent was added and mixed, and the resulting mixture cast in aluminum pans having a 57 mm diameter. Example 5 was cured at a temperature of 65° C. for 2 hours in an oven. Example 6 was cured at a temperature of 60° C. for 2 hours followed by post-curing at a temperature of 100° C. for 2 hours. For each example, the cured material was machined into a toroid or doughnut-shaped sample having an outer diameter of 2.54 cm and an inner diameter of 1.10 cm using a Milling Machine with a Carbide Tool. For Example 10 (the solid epoxy resin system of Synthesis Example S3 with 63.5 wt % CuO Filler and 0.36 wt % CB Filler-2), the epoxy resin, fillers, and the curing agent were compounded using a Twin Screw Extruder at a temperature of 110° C. The extruded material was cured at a temperature of 110° C. overnight, and post-cured at a temperature of 200° C. for 15 minutes. The cured material was machined into a toroid shaped sample using method as for Comparative Examples C2 and C3 above. The samples had a thickness of 2-5 mm. Complex dielectric properties were calculated over the frequency range from S-parameters obtained using the Network Analyzer coupled with the Air Coax Test Fixture. The results are shown in FIGS. 13 and 14, illustrating the dielectric constant vs. the frequency and the loss tangent vs. the frequency, respectively, of Example 8 (1301, 1401), Example 9 (1302, 1402), and Example 10 (1303, 1403).

Examples 11-14 and Comparative Examples C6-C7

A series of samples with the epoxy resin systems of Synthesis Examples S1-S2 with or without fillers were prepared on PI Film and analyzed. Comparative Examples C6 and C7 are epoxy resin systems with no fillers, Examples 11 and 12 are epoxy resin systems with CuO Filler, and Examples 13 and 14 are epoxy resin systems with CuO Filler and CB Filler-2. For Comparative Example C6 (the liquid epoxy resin system of Synthesis Example S1) and Comparative Example C7 (the liquid epoxy resin system of Synthesis Example S2), the epoxy resin and the curing agent were mixed in a high speed mixer. Once a uniform suspension with a viscosity suitable for coating was obtained, the suspension was coated on primed PI Film using a wet film applicator with a 125 micrometer (5 mil) clearance setting. Comparative Example C6 was cured at a temperature of 65° C. for 2 hours in an oven. Comparative Example C7 was cured at a temperature of 60° C. for 2 hours followed by post-curing at a temperature of 100° C. for 2 hours. The cured coating layer has a thickness of 80-100 micrometers. For Example 11 (the liquid epoxy resin system of Synthesis Example S1 with 70.5 wt % CuO Filler) and Example 12 (the liquid epoxy resin system of Synthesis Example S2 with 70.8 wt % CuO Filler), the epoxy resin and CuO Filler were mixed in a high speed mixer, the curing agent was added and mixed. Once a uniform suspension with a viscosity suitable for coating was obtained, the suspension was coated on primed PI Film using a wet film applicator with a 125 micrometer (5 mil) clearance setting. Example 11 was cured at a temperature of 65° C. for 2 hours in an oven. Example 12 was cured at a temperature of 60° C. for 2 hours followed by post-curing at a temperature of 100° C. for 2 hours. The cured coating layer has a thickness of 80-100 micrometers. For Example 13 (the liquid epoxy resin system of Synthesis Example S1 with 64.8 wt % CuO Filler and 0.55 wt % CB Filler-2) and Example 14 (the liquid epoxy resin system of Synthesis Example S2 with 65.2 wt % CuO Filler and 0.55 wt % CB Filler-2), the epoxy resin, CuO Filler, and CB Filler-2 were mixed in a high speed mixer, the curing agent was added and mixed. Once a uniform suspension with a viscosity suitable for coating was obtained, the suspension was coated on primed PI Film using a wet film applicator with a 125 micrometer (5 mil) clearance setting. Example 13 was cured at a temperature of 65° C. for 2 hours in an oven. Example 14 was cured at a temperature of 60° C. for 2 hours followed by post-curing at a temperature of 100° C. for 2 hours. The cured coating layer has a thickness of 80-100 micrometers. Complex dielectric properties were calculated over the frequency range from S-parameters obtained using the Network Analyzer coupled with the Air Coax Test Fixture. The results are shown in FIGS. 15-20, illustrating the dielectric constant vs. the frequency and the loss tangent vs. the frequency, respectively, of Comparative Example C6 (1501, 1601), Comparative Example C7 (1502, 1602), Example 11 (1701, 1801), Example 12 (1702, 1802), Example 13 (1901, 2001), and Example 14 (1902, 2002).

What is claimed is:
1. A composite comprising:
   a lossy polymeric matrix, wherein the lossy polymeric matrix has a dielectric loss tangent of from 0.005 to 0.50 and wherein the lossy polymeric matrix comprises a fluorocarbon-based polymeric matrix comprising a polyvinylidene fluoride polymer or copolymer;
   ceramic particles dispersed within the polymeric matrix; and
   conductive particles dispersed within the polymeric matrix, wherein the composite is
   an electromagnetic interference mitigating material.
2. The composite of claim 1, wherein the fluorocarbon-based polymer or copolymer comprises a terpolymer of tetrafluoroethylene, hexafluoropropylene, and vinylidene fluoride.
3. The composite of claim 1, wherein the ceramic particles are selected from the group consisting of metal oxide particles, metal nitride particles, metal carbide particles, metal sulfide particles, metal silicide particles, metal boride particles, particles of multiferroic compounds, mixed ceramic particles, chalcogenide glass particles, or a combination thereof.

4. The composite of claim 3, wherein the metal oxide particles comprise copper oxide (CuO) particles.

5. The composite of claim 1, wherein the conductive particles are selected from the group consisting of carbon black, carbon bubbles, carbon foams, graphene, carbon fibers, graphite, carbon nanotubes, metal particles and nanoparticles, metal alloy particles, metal nanowires, PAN fibers, conductive-coated particles, or a combination thereof.

6. The composite of claim 1, wherein the lossy polymeric matrix comprises a terpolymer of tetrafluoroethylene, hexafluoropropylene, and vinylidene fluoride, and wherein the ceramic particles comprise copper oxide (CuO) particles, and wherein the conductive particles comprise carbon black.

7. The composite of claim 1, wherein the lossy polymeric matrix comprises a polyvinylidene fluoride polymer, and wherein the ceramic particles comprise copper oxide (CuO) particles, and wherein the conductive particles comprise carbon black.

8. The composite of claim 1, wherein the composite mitigates electromagnetic interference in the 100 MegaHertz-100 GigaHertz range.

9. The composite of claim 1, wherein the composite mitigates electromagnetic interference in the 1-20 GigaHertz range.

10. A composite comprising:
a lossy polymeric matrix, wherein the lossy polymeric matrix has a dielectric loss tangent of from 0.005 to 0.50 and wherein the lossy polymeric matrix comprises comprises a terpolymer of tetrafluoroethylene, hexafluoropropylene, and vinylidene fluoride; and
copper oxide (CuO) particles dispersed within the polymeric matrix, wherein the
composite is an electromagnetic interference mitigating material.

11. The composite of claim 10, wherein the composite mitigates electromagnetic interference in the 100 MegaHertz-100 GigaHertz range.

* * * * *